April 13, 1937.  W. B. SMITH  2,076,600
FLOW CONTROLLED DEVICE
Filed May 27, 1936  3 Sheets-Sheet 1

Inventor
William B. Smith

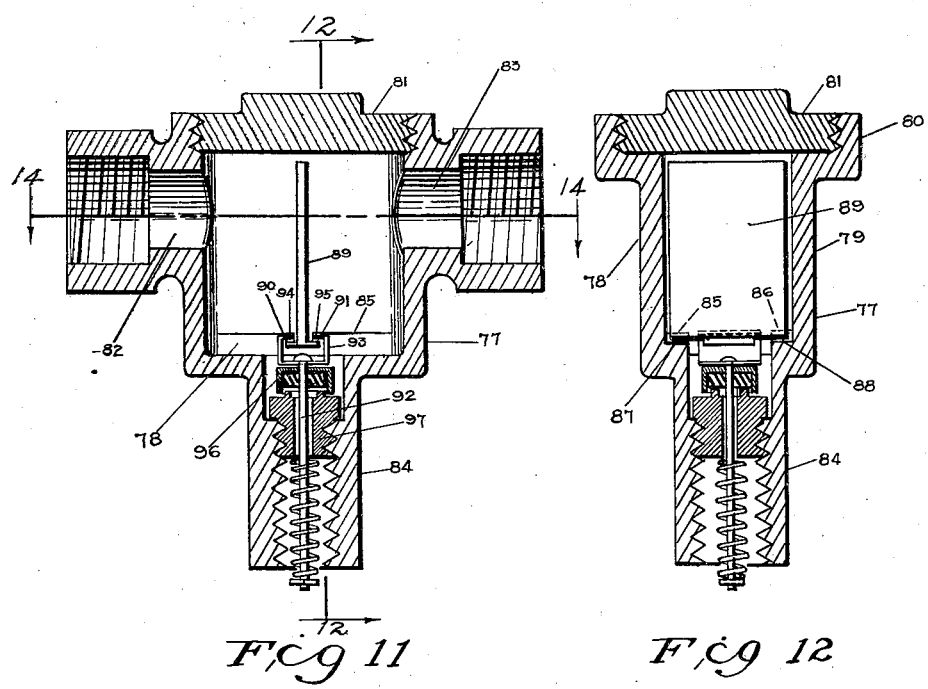
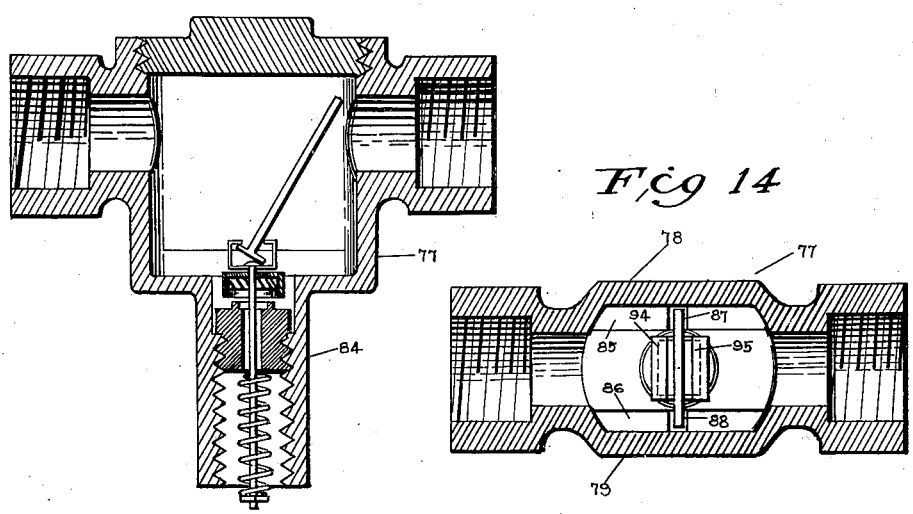
Fig 11  Fig 12  Fig 13  Fig 14

Patented Apr. 13, 1937

2,076,600

UNITED STATES PATENT OFFICE 2,076,600

FLOW CONTROLLED DEVICE

William B. Smith, Washington, D. C.

Application May 27, 1936, Serial No. 82,136

20 Claims. (Cl. 182—12)

The present invention relates to devices wherein flow movement is utilized, for example, to effect flow escape or air intake. Such devices find typical use as means for priming drain traps or for venting pipe lines and the like, and in the following description the invention will be described in such embodiments.

The invention has as its main object to provide devices made up of few parts, readily manufactured, and easily assembled to produce simple but highly efficient articles. A further important object is to provide such devices as will be effective regardless of the direction of flow therethrough so that incorrect installation is rendered impossible.

Figure 1:
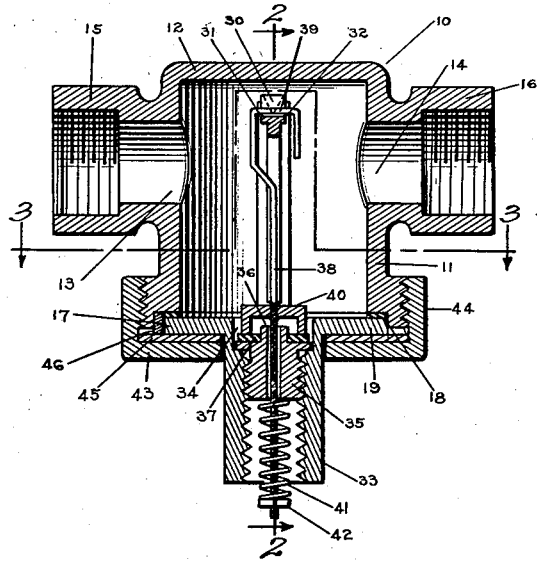
Figure 2:
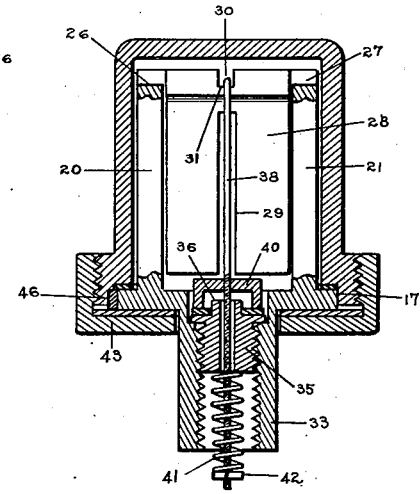
Figure 3:
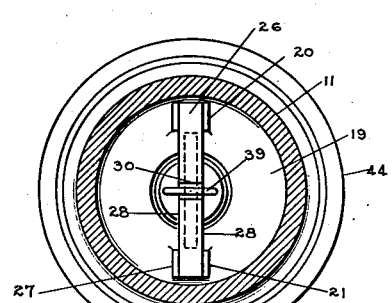
Figure 4:
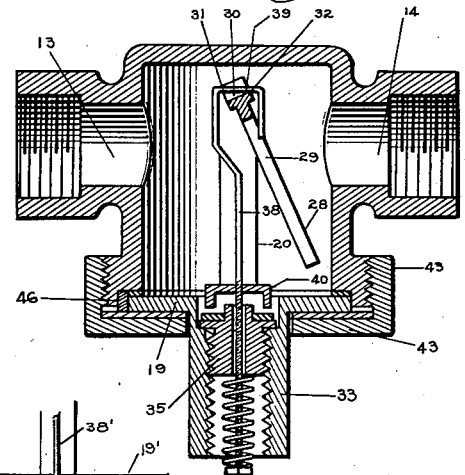
Figure 5:
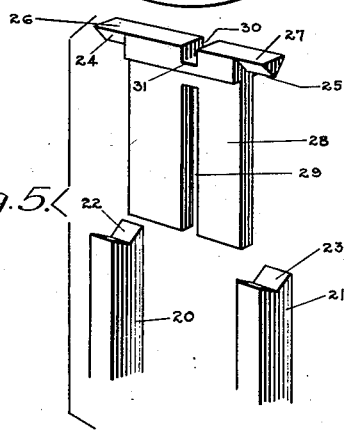
Figure 6:
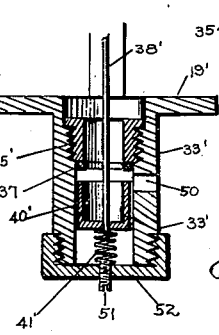
Figure 7:
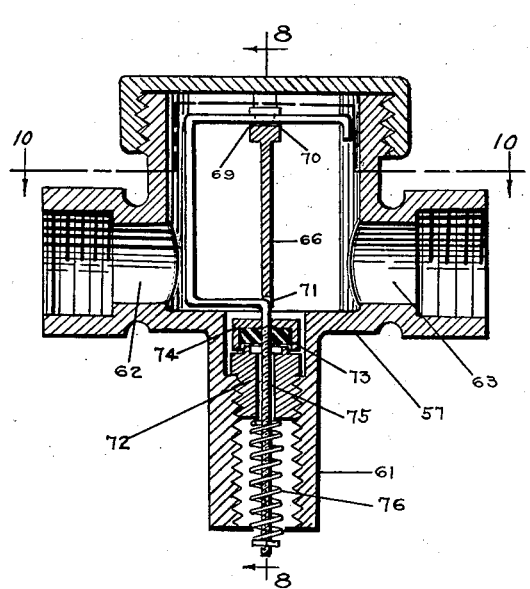
Figure 8:
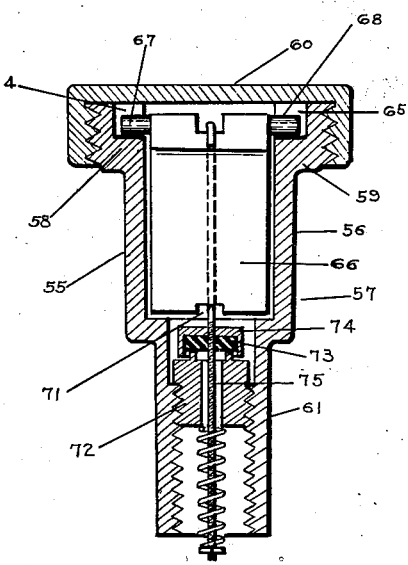
Figure 9:
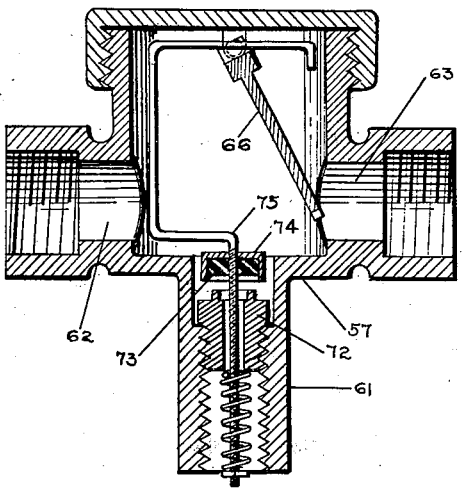
Figure 10:
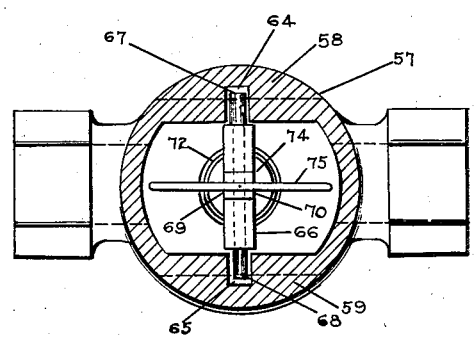

In the accompanying drawings, with reference to which the principles of the invention will be explained:

Figure 1 is a sectional view of a priming device in accordance with the invention, Figure 2 is a section substantially on line 2—2 of Figure 1, Figure 3 is a section substantially on line 3—3 of Figure 1, Figure 4 is a view similar to that of Figure 1, but with the parts in different relation, Figure 5 is a view, in perspective, showing in part and in disassociated relation certain parts appearing in the preceding figures, Figure 6 is a sectional view of parts modified to provide a venting device or syphon breaker, Figure 7 is a sectional view of a modified form of priming device, Figure 8 is a section substantially on line 8—8 of Figure 7, Figure 9 is a view similar to that of Figure 7 but with the parts in different relation, Figure 10 is a section substantially on line 10—10 of Figure 7, Figure 11 is a sectional view of a further modified form of priming device, Figure 12 is a section substantially on line 12—12 of Figure 11, Figure 13 is a view similar to that of Figure 11, but with the parts in different relation, and Figure 14 is a section substantially on line 14—14 of Figure 11.

Referring to the drawings and first to Figs. 1 to 5, reference numeral 10 designates generally a housing whose main portion is of generally cylindrical form, having the cylindrical side walls 11 and the end closure wall 12, desirably formed as an integral casting. Ports 13 and 14 are formed in diametrically opposite portions of the side walls and exteriorly of the casing are rimmed by the internally threaded flanges 15 and 16. The open end of the housing is externally threaded, the edge being provided with an internal annular recess 17 in which is disposed a packing ring 18.

A circular cover 19 is of a size to be received within recess 17 and to seat against gasket 18. At diametrically opposite points the cover carries a pair of pedestals 20 and 21, these being spaced apart so as to be receivable within the housing in the manner shown. The upper ends of the pedestals 20 and 21 are provided with angular notches 22 and 23 in which are received the knife edge bearings 24 and 25 of trunnions 26 and 27 from which depends a flap or vane 28. The vane 28 is provided with a longitudinally extending slot 29, the upper edge of the vane, above the slot, having a transversely extending groove 30 formed therein. The bottom edges 31 and 32 of the groove are eccentric to the knife edges 24 and 25 and are equally spaced from the plane of the latter.

Cover 19 has a central outwardly extending boss 33, the boss being provided with an axial bore threaded at its outer portion and enlarged as at 34, at its inner end, to provide an abutment shoulder. A plug 35 is threaded in the inner end of the bore and has a flange which abuts the shoulder. Plug 35 has an axial bore rimmed at the inner end of the plug by a neck 36, the latter being embraced by a compressible washer 37 which rests against the inner end of the plug.

A pin or stem 38 extends through the passage of the plug in spaced relation to the passage walls, the stem having a hook shaped upper end comprising a cross portion 39 substantially perpendicular to the main portion of the stem and lying in groove 30 of flap 28. The outer portion of the stem is threaded and has screwed thereon a cup shaped valve member 40 whose edges are adapted to co-operate with washer 37 as a seat. A compression spring 41 surrounds the outer end of stem 38, its ends abutting the outer end of plug 35 and an abutment nut 42 threaded on the extremity of the stem. The spring holds the valve member normally seated. It is precautionary and may be omitted when the primer is so positioned that the vane is pendulous.

Cover 19 is held in place by means of a ring nut 43 having a flange 44 in threaded engagement with the body 10, a gasket 45 being interposed between the nut and the cover, if desired. The plane of pedestals 20 and 21 is intended to be at right angles to the axis of ports 13 and 14 and to insure their proper position a key 46 may be set in registering grooves in the body edge and cover 19, Fig. 1.

The body 10 is intended to be interposed in a fluid supply line such as a water line leading to a fixture which may be a faucet in regular use. Either of ports 13 or 14 may be the inlet port and the other the outlet port. The normal position of the vane is that shown in Fig. 1, wherein the vane lies in the plane of the plug aperture with the pin 38 received in slot 29. Upon flow through the casing in either direction the vane will be deflected so that one or the other of edges 31, 32 will act on cross portion or follower 39 to cam stem 38 upwardly, thus lifting valve member 40 from its seat and permitting escape through the plug aperture. Neck 33 has threaded therein a pipe which leads to a fitting such as a drain trap which it is desired to maintain full or flushed.

In initial installation cross portion 39 lies somewhat above the bottom of groove 30 as indicated in Fig. 1 so as to permit valve 40 to seat securely. The proper amount of escape through plug 35 may, of course, be obtained by providing a plug opening of the required size.

In Fig. 4, it is assumed that flow is taking place through port 13 to port 14. Swinging movement of the vane is limited, as indicated, by the abutment of the lower corners of the latter with the cylindrical walls 11. Full flow to outlet 14 is insured since fluid may pass above, below, and around the sides of the vane and also through slot 29. Due to these flow clearances, the vane will not be moved unless substantial flow occurs. Consequently in the case of a leaky faucet, for example, the vane will not be affected and valve 40 will remain in closed position unless the faucet is opened.

The priming device as described may have associated therewith, if desired, a venting device such as disclosed in my co-pending application Serial Number 729,125 filed June 5, 1934.

If the device is intended to be used for venting purposes the valve should be normally open. The necessary rearrangement is readily made and is shown in Fig. 6. In this figure the cover designated at 19' is associable with the housing heretofore described. The plug 35' has a relatively large opening and has affixed to its outer end a compressible annular gasket 37' outwardly of which is a slot 50 formed in extension 33'. The stem 38' has threaded thereon a valve member 40' co-operable with the seat constituted by gasket 37', stem 38' and valve member 40' being normally held in the position illustrated by means of a tension spring 41' secured at one end to the outer end of stem 38' and at the other end to a plug 51 threaded in a cap 52 which is screwed on the extremity of extension 33'.

Stem 38' has a follower portion co-operating with a movable vane as hereinbefore described and upon flow the stem is moved to seat valve member 40' so that flow from the inlet to the outlet of the housing may occur without fluid escape through slot 50. In the absence of flow through the housing, valve member 40' occupies the unseated position illustrated so that slot 50 is in free communcation with the interior of the housing and syphon action through the latter is impossible. As installed, for example, between a flush valve and a bowl, the flow passage will be vertical and the slot 50 faced upwardly so that no leakage through the slot will occur.

In the embodiment of Figures 7 to 10 the side walls 55 and 56 of the body 57 are parallel, their top portions having arcuate enlargements 58 and 59 so that the body has a circular top which has threaded thereon a cover 60. The depending neck 61, corresponding to the neck 33 of Figure 1 in function, is integral with the body. The ports 62 and 63 are adjacent the bottom of the body cavity. Enlargements 58 and 59 have downwardly extending recesses 64 and 65 with arcuate bottoms, the recesses being in a plane perpendicular to the axis of ports 62 and 63 and in the axis of neck 61. The body may be die cast, as in the first embodiment, in suitable metal.

The vane 66 has cylindrical trunnions 67 and 68 pivotally received in recesses 64 and 65 which are upwardly closed by the cover 60. The vane has a central top recess with cam edges 69 and 70 and may have a central bottom recess 71. The plug 72 has a top annular rib co-operating with a gasket 73 carried by a cup-shaped valve member 74 threaded on a stem 75, the gasket being normally held seated by a compression spring 76. The spring may be omitted. Stem 75 has a wide hook-shaped upper portion so that the shallow slot 71 suffices to provide swinging clearance and the long slot of the first embodiment is avoided.

The mode of operation is the same as in the first embodiment although the device is more sensitive in view of the relation of the flow passage to the vane and in view of the reduced clearances at the sides of the vanes and the absence of the long vane slot. The sensitiveness may of course be controlled by varying the clearances. Ordinarily it is desirable that slight flow be possible without causing valve member 74 to lift. The operative swing of the vane may be in either direction.

In the embodiment of Figures 11 to 14 the body 77 has parallel side walls 78 and 79 which are enlarged to provide a circular top flange 80 which is internally threaded and receives a closure plug or top 81. The flow ports 82 and 83 are just below the closure 81 and the body has an integral depending neck 84.

Shoulders 85 and 86 at the bottom of the body cavity have recesses 87 and 88 in a plane perpendicular to the axis of the flow ports and in the axis of neck 84. These recesses pivotally receive the lower edge of a vane 89 which centrally has flanges 90 and 91 perpendicular to its plane.

A stem 92 has fixed to its upper end a U-shaped member 93 whose inturned ends 94 and 95 overlie the flanges 90 and 91. A valve member 96 fixed to the stem 92 co-operates with a plug 97, being normally seated by a compression spring 98 which may be omitted. Upon flow in either direction one or the other of the vane flanges will exert a camming action on member 93 to lift member 96 to cause flow through neck 84.

Obviously the operating means of Figures 7 and 11 may be applied to the venting means of Figure 6 and changes in form and arrangement may be made without departure from the invention. I do not limit myself in these respects except as in the following claims.

I claim:

1. A device of the class described comprising a body having a through flow passage, a pivotally mounted vane normally extending transversely of the line of flow through said passage, said vane being swingable under the force of fluid traversing said passage, there being an orifice communicating with said passage, a movable valve element controlling said orifice, cam means rocked as a result of swinging of said vane, and follower means engaging said cam means and connected to said valve element for controlling the latter in dependence upon the position of said vane.

2. A device of the class described comprising a body having a through flow passage, a pivotally mounted vane normally extending transversely of the line of flow through said passage, said vane being swingable under the force of fluid traversing said passage, there being an orifice communicating with said passage, a movable valve element controlling said orifice, cam means rocked as a result of swinging of said vane, and follower means engaging said cam means and connected to said valve element for controlling the latter in dependence upon the position of said vane, said vane having an operative effect in either direction of swing.

3. A device of the class described comprising a body having a through flow passage, a vane pivotally mounted in said body and normally extending directly across said passage, there being an orifice communicating with said passage substantially in the plane of said vane when the latter is in its normal position, a reciprocable valve element controlling said orifice, and transmission means between said vane and said valve for controlling the latter in dependence upon the position of said vane.

4. A device of the class described comprising a body having a through flow passage, a vane pivotally mounted in said body and normally extending directly across said passage, there being an orifice communicating with said passage substantially in the plane of said vane when the latter is in its normal position, a reciprocable valve element controlling said orifice, and transmission means between said vane and said valve for controlling the latter in dependence upon the position of said vane, said vane having an operative effect in either direction of swing.

5. A device of the class described comprising a body having a through flow passage, said body having an opening between the ends of said passage, said vane being swingable under the there being an escape orifice in said cover, a movable valve element controlling said orifice, a pivotally mounted vane normally extending transversely of the line of flow through said passage, said vane being swingable under the force of fluid traversing said passage, and transmission means between said vane and said valve element for controlling the latter in dependence upon the position of said vane.

6. Structure according to claim 5 wherein said cover carries bearing means for pivotally mounting said vane.

7. Structure according to claim 5 wherein said cover has an outwardly extending boss through which said orifice extends, and wherein a flanged ring screw-threaded on the body is provided for holding said cover in place.

8. Structure according to claim 5 wherein said orifice is formed in a plug threaded in an opening in said cover.

9. Structure according to claim 5 wherein said orifice is formed in a plug threaded in an opening in said cover, and wherein a stem secured to said valve element extends through said orifice and is engaged by a spring yieldingly holding the valve element seated.

10. Structure according to claim 1 wherein the cam means is fixed to the vane coaxially with the latter.

11. Structure according to claim 1 wherein the cam means is fixed to the vane coaxially with the latter and has opposed rises so as to be operative in either direction of swing of the vane to move the valve element.

12. Structure according to claim 1 wherein the cam means is fixed to the vane coaxially with the latter, wherein the pivotal axis of the vane is at one end thereof and the orifice is opposite the free end of the vane when the latter is in normal position, wherein the cam means is coaxial with the pivotal axis of the vane, and wherein the follower means is in the form of a hook.

13. A device of the class described comprising a body having a through flow passage and an orifice between the ends of said passage, a movable valve member controlling said orifice, movable means in said passage moved as a result of flow through said passage in either direction, and transmission means between said movable means and said valve member for controlling the latter in dependence upon the position of said movable means.

14. A device of the class described comprising a body having a through flow passage and an orifice leading from said flow passage, means controlling said orifice, and means actuated upon flow through said flow passage in either direction for actuating said controlling means.

15. Structure according to claim 14 wherein a removable cover is provided for said body, said cover having the orifice formed therein and carrying the control means for said orifice.

16. Structure according to claim 3 wherein said transmission means comprises a stem in the normal plane of said vane and wherein said vane is provided with a slot to permit its swinging in either direction without interference with said stem.

17. Structure according to claim 1 wherein the vane is pivoted on bearings formed in the walls of said body.

18. Structure according to claim 1 wherein the vane is pivoted on bearings formed in the walls of said body, and wherein the body has a removable cover enabling insertion and removal of the vane.

19. Structure according to claim 1 wherein the vane is pivoted on an axis adjacent the orifice.

20. Structure according to claim 1 wherein the vane is pivoted on an axis adjacent the orifice and wherein the cam means is operative in either direction of swing of the vane.

WILLIAM B. SMITH.